(12) United States Patent
Olivier et al.

(10) Patent No.: US 11,868,473 B2
(45) Date of Patent: Jan. 9, 2024

(54) METHOD FOR CONSTRUCTING BEHAVIOURAL SOFTWARE SIGNATURES

(71) Applicant: ORANGE, Issy les Moulineaux (FR)

(72) Inventors: Baptiste Olivier, Chatillon (FR); Xiao Han, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 277 days.

(21) Appl. No.: 17/430,922

(22) PCT Filed: Jan. 30, 2020

(86) PCT No.: PCT/FR2020/050142
§ 371 (c)(1),
(2) Date: Aug. 13, 2021

(87) PCT Pub. No.: WO2020/165519
PCT Pub. Date: Aug. 20, 2020

(65) Prior Publication Data
US 2022/0129550 A1   Apr. 28, 2022

(30) Foreign Application Priority Data
Feb. 14, 2019   (FR) ...................................... 1901530

(51) Int. Cl.
*G06F 21/56*   (2013.01)
(52) U.S. Cl.
CPC ...... *G06F 21/564* (2013.01); *G06F 2221/033* (2013.01)
(58) Field of Classification Search
CPC ............. G06F 21/564; G06F 2221/033; G06F 21/566; G06F 21/561
See application file for complete search history.

(56) References Cited

U.S. PATENT DOCUMENTS

| 7,873,947 B1 * | 1/2011 | Lakhotia | G06F 21/562 |
| | | | 717/149 |
| 8,826,439 B1 * | 9/2014 | Hu | G06F 21/56 |
| | | | 726/24 |

(Continued)

FOREIGN PATENT DOCUMENTS

EP   3499396 A1   6/2019

OTHER PUBLICATIONS

English translation of the Written Opinion of the International Searching Authority dated Apr. 20, 2020 for corresponding International Application No. PCT/FR2020/050142, filed Jan. 30, 2020.

(Continued)

*Primary Examiner* — Ali S Abyaneh
(74) *Attorney, Agent, or Firm* — David D. Brush; Westman, Champlin & Koehler, P.A.

(57) ABSTRACT

A method for constructing behavioral software signatures. The method includes: embedding execution traces of a set of software in a vector space, an execution trace of a software agent including at least one event and being representative of the execution of the software, the embedding representing an event of the execution trace by a vector encoding a context for occurrence of the event; partitioning the vectors associated with the software of the set to generate a data group representative of a behavior, a behavioral label being associated with the data group; associating a behavioral label with a vector, which is representative of the data group to which the vector belongs, and associating a trace of behavioral labels with a trace of vectors, the trace of labels being representative of execution of a software agent, and extracting in the trace of labels at least one behavioral signature associated with the software.

7 Claims, 1 Drawing Sheet

(56) References Cited

U.S. PATENT DOCUMENTS

| | | | |
|---|---|---|---|
| 2011/0271341 A1 | 11/2011 | Satish et al. | |
| 2016/0306972 A1* | 10/2016 | Cui | G06F 21/564 |
| 2017/0337372 A1* | 11/2017 | Zhang | G06F 21/53 |
| 2018/0041536 A1* | 2/2018 | Berlin | H04L 63/1416 |
| 2019/0171816 A1* | 6/2019 | Copty | G06N 20/00 |
| 2019/0179906 A1* | 6/2019 | Lai | G06F 18/217 |
| 2020/0012789 A1* | 1/2020 | Usui | G06F 18/23 |

OTHER PUBLICATIONS

Ishai Rosenberg et al., "Defense Methods Against Adversarial Examples for Recurrent Neural Networks", arxiv.org, Cornell University Library, 201 Olin Library Cornell University Ithaca, NY 14853, Jan. 28, 2019 (Jan. 28, 2019), XP081023825.

Tae-Uk Yun et al., "Malware Variant Classification based on Attention Mechanism and Word2Vec", Oct. 31, 2018 (Oct. 31, 2018), XP055638581.

International Search Report dated Apr. 9, 2020 for corresponding International Application No. PCT/FR2020/050142, Jan. 30, 2020.

Written Opinion of the International Searching Authority dated Apr. 9, 2020 for corresponding International Application No. PCT/FR2020/050142, filed Jan. 30, 2020.

\* cited by examiner

METHOD FOR CONSTRUCTING BEHAVIOURAL SOFTWARE SIGNATURES

CROSS-REFERENCE TO RELATED APPLICATIONS

This application is a Section 371 National Stage Application of International Application No. PCT/FR2020/050142, filed Jan. 30, 2020, which is incorporated by reference in its entirety and published as WO 2020/165519 A1 on Aug. 20, 2020, not in English.

FIELD OF THE DISCLOSURE

The present invention relates to the field of software packages, and more precisely to the field of the construction of behavioral signatures of the activity of software packages.

The present invention is particularly advantageously applicable to the detection of malicious software. Malicious software, or "malware", is a major threat in the world of the Internet. Such software packages are usually grouped into various categories. Thus, viruses, which are designed to spread by inserting themselves into various media such as legitimate software packages, and which may disrupt the operation of an infected computer to a greater or lesser extent, are known. Trojan horses, or "trojans", which are apparently legitimate software packages that contain a malicious functionality that is intended to be installed on a computer without the user knowing, are also known. Spyware, which installs itself on a user terminal, a mobile terminal or a personal computer for example, and the purpose of which is to collect and transfer information from the environment in which it is installed, are also known. Ransomware, which takes personal data hostage by encrypting this data, then asks the owner thereof to send money in exchange for the key that will allow them to be decrypted, is also known.

BACKGROUND OF THE DISCLOSURE

Behavioral methods for analyzing the activity of malicious software packages have been developed with the aim of classifying malicious software packages into various families, detecting them, and identifying new threats. Such a method is described in the patent application published under the number US 2011/0271341. It proposes to collect sequential execution traces of malicious software packages in a particular environment, in the form of events such as API requests to the operating system of the machine on which they are executed, then to standardize these event traces into a standard representation of certain parameters, in order to be able to compare with and group into various families the execution of various malicious software packages. Such a standardization consists for example in deleting from a request a path in a tree structure, a directory or file name, or in replacing a parameter with a wildcard. This standardization is intended to allow for various malware variants. The data obtained after standardization are called "behavioral sequences". The method then comprises a step of grouping data, in the present case of behavioral sequences. The step of grouping data, called the "clustering" step, is intended to group together behavioral sequences that belong to the same family of malicious software packages. A plurality of clusters are thus obtained, each being representative of the behavior of a given family of malicious software packages. The method then proposes to analyze the cluster thus obtained in order to identify behavioral sub-sequences common to a family of malicious software packages, and finally to create a behavioral signature for the family of malicious software packages using this sub-sequence.

The proposed method requires, in the standardization step, an expert in the field to validate the generalization operations, such as a generalization from one attribute to another. It may be qualified a "skilled" standardization. This human intervention is a problem as regards automation and large-scale deployment of this solution. Specifically, as malware evolves, the skilled experts must keep the standardization procedure up to date. Software packages can also apply evasion techniques to bypass the security measures put in place to detect them. A malicious software package implementing an evasion technique is for example able to detect that it is being executed in a particular execution environment and to generate sequences of benign events or to replace events with equivalents. The use of raw events to construct signatures is not resistant to these attack techniques.

SUMMARY

One of the aims of the invention is to remedy inadequacies/drawbacks of the prior art and/or to make improvements thereto.

To this end, the invention proposes a method for constructing behavioral signatures of software packages, said method comprising:

embedment of execution traces of a set of software packages in a vector space, an execution trace of a software package comprising at least one event and being representative of the execution of the software package, said embedment being intended to represent an event of the execution trace with a vector encoding a context of occurrence of the event, cluster analysis of the vectors associated with the software packages of the set, said cluster analysis generating at least one data group, the data group being representative of a behavior, a behavioral label being associated with said data group, association of a behavioral label with a vector, the behavioral label associated with the vector being representative of the data group to which the vector belongs, and association of a behavioral-label trace with a vector trace, said label trace being representative of the execution of a software package, extraction from the label trace of at least one behavioral signature associated with the software package.

The method makes it possible to extract behavioral signatures that correspond to behavioral-label sub-sequences, instead of to the raw API-call sub-sequences common to a cluster used in known methods. The behavioral labels are constructed using machine algorithms, without a priori information from skilled experts. In particular, the construction of these labels requires neither the injection of skilled knowledge into the training algorithms nor labeled data. Specifically, the method is based on unsupervised learning only. The method would therefore appear to be more complete and more objective.

The embedment of the events in the vector space makes it possible to preserve semantic information linking the various events, i.e. information on the logical arrangement of the various events during the execution of a software package. This embedment has the effect of clustering semantically similar events and therefore of making a generalization of the events that is consistent with the semantics of the events or their context of occurrence. This aspect is essential because it makes it possible to isolate the semantics of an event, especially a malicious event, rather than preserving raw events or sequences of events.

The use of labels makes it possible, on the one hand, to notably reduce the computational complexity in the construction of characteristic signatures of families of software packages. Specifically, the computation carried out to construct the signatures is carried out on labels the total number of which is negligible with respect to the total number of events. Furthermore, it allows, in the case of malware, the evasion techniques used by malware designers to be fought against more effectively, since the signatures that are used during the clustering depend on behavioral labels, which are more generic than events. The use of behavioral labels, which take into account the context of execution of an event, adds an overlay in the standardization which, therefore, becomes more abstract. Thus, the method is less sensitive to evasion techniques. For example, if in a malicious software package a sequence of events is replaced by semantically equivalent events, the new sequence thus created will end up in the same cluster as the initial sequence.

As the method is more able than known methods to fight against evasion techniques, it is also more able, when it is used on malware, to classify malware, and therefore to detect malware since detection is based on classification.

In one exemplary embodiment, the method comprises collection of execution traces of the set of software packages, an event of an execution trace of a software package corresponding to an API call to the operating system of a server hosting a controlled environment for executing software packages. The execution traces are collected in a protected environment. This makes it possible, especially in the case of execution of malicious software packages, to limit the risks as regards the operating system of the server on which the collection is implemented.

In a first exemplary embodiment, the embedment is based on training of an artificial neural network that seeks to explain an event depending on its context.

The embedment is based on a proven technique, in the present case the method known by the name of "Word2Vec". This embedment preserves information relative to the context of occurrence of events. Thus, the vectors obtained are linked, just as the events resulting from the execution of a software package may be, thus encoding the activities of the software package.

In a first exemplary embodiment, the extraction from the label trace of said at least one behavioral signature associated with the software package consists in identifying at least one signature said to be "of the first order", such that: the execution of a software package being represented by a behavioral-label trace, the signature of the first order associated with the software package is a k-gram present in the behavioral-label trace, i.e. a sequences of size k of successive labels comprised in the trace. Patterns, or simple signatures, or signatures of the first order, which encode the sub-activities of the software package during its execution, are extracted from the label representations of the execution of the software package. Such signatures are intended to be used to construct combinations of signatures, or "complex" signatures.

In a second exemplary embodiment, the extraction from the behavioral-label trace of at least one behavioral signature of an order at least equal to two consists in combining at least two signatures of the first order by means of Boolean operators, the combination of the signatures of the first order being present in the execution trace of the software package.

This example corresponds to the extraction of combinations of simple signatures, or signatures of the first order. "Yara" signatures, which are currently used most in sandbox systems, were the inspiration for the construction of combinations of signatures. Such signatures are intended to detect typical byte patterns of certain malicious software packages in binary files. These typical patterns are logical combinations of particular byte sequences. Just as with Yara signatures, signatures of any order are defined from combinations of signatures of the first order. These signatures are intended to be used, for example, in a detecting system, in order to identify complex behaviors during the execution of malicious software packages.

The invention also relates to the use of the method for constructing behavioral signatures of software packages such as described above, by a module for classifying software packages, said module using a training database of tagged malicious software packages, a tag specifying the family to which a malicious software package belongs, signatures characteristic of families of malicious software packages being extracted, a new software package being automatically classified into a family of malicious software packages by comparing signatures extracted for said new software package with those characteristic of the families.

The method of the invention may advantageously be used to classify software packages, especially software packages the behavior of which is questionable, and to identify the family to which they belong. The database of the signatures extracted with the method for constructing behavioral signatures of software packages may advantageously be used to carry out supervised training during which the signatures that are the most characteristic of a family of software packages are sought in the training database, which comprises a set of malicious software packages. Once the model has been constructed from learned behavioral signatures, it is possible to automatically classify software packages the behavior of which is questionable, the classification impeding any evasion techniques implemented in the software package studied.

The invention also relates to the use of the method for constructing behavioral signatures of software packages such as described above, by a module for detecting new malicious software packages, said module using a completed training database comprising, in addition to malicious software packages, benign software packages, this module being fed as input a new software package and detecting a new threat when the behavior of the new software package differs from the behavior of the software packages of the completed training database.

The method of the invention may also be advantageously used to identify new malicious behaviors, i.e. malicious behaviors that have so far not been encountered and that in any event do not feature in the training database of malicious software. To this end, a new training database is constructed that comprises the most exhaustive possible set of both benign software packages and known malicious software packages. When a new attack, or "0-day" attack, which uses a mode of action different from known and referenced malware appears, then a behavior distinct from those stored in the new training database is observed. It is also possible to analyze, as regards the observed new type of malicious software package, similarities with known malicious software packages, by comparing the signatures extracted from the new malicious software package with the signatures present in the signature database associated with the known malicious software packages.

The invention also relates to a server for constructing behavioral signatures of software packages, said server comprising:
embedding means, arranged to embed execution traces of a set of software packages in a vector space, an execution trace of a software package comprising at least one event and being representative of the execution of the software package, said embedment being intended to represent an event of the execution trace with a vector encoding a context of occurrence of the event,
clustering means, arranged to cluster the vectors associated with the software packages of the set, said clustering generating at least one data group, the data group being representative of a behavior, a behavioral label being associated with said data group,
associating means, arranged to associate a behavioral label with a vector, the behavioral label associated with the vector being representative of the data group to which the vector belongs, and association of a behavioral-label trace with a vector trace, said label trace being representative of the execution of a software package,
extracting means, arranged to extract from the label trace at least one behavioral signature associated with the software package.

The invention also relates to a computer program on a data medium and loadable into the memory of a server, comprising program-code instructions intended to control the execution of the steps of the method for constructing behavioral signatures of software packages described above, when the program is executed on said server.

The invention lastly also relates to a data medium on which the above program is stored.

BRIEF DESCRIPTION OF THE DRAWINGS

Other features and advantages of the present invention will be better understood from the description and the appended drawings, in which.

DETAILED DESCRIPTION OF ILLUSTRATIVE EMBODIMENTS

Figure 1:
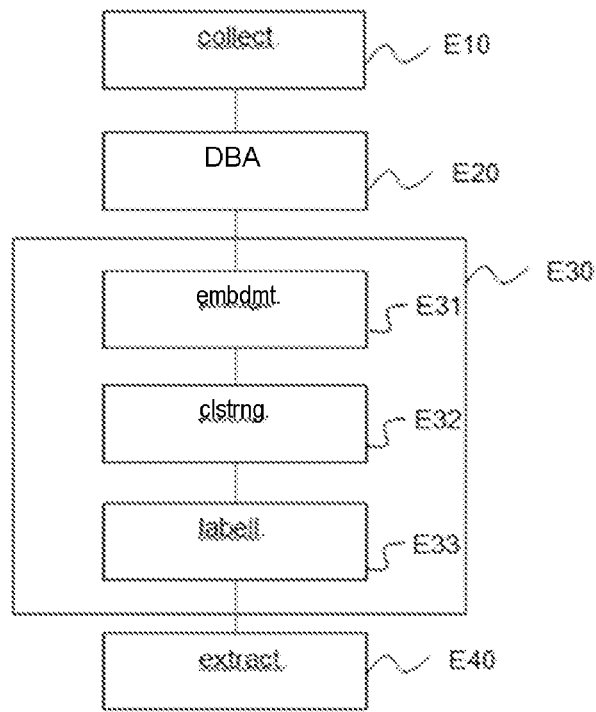
FIG. 1 shows the steps of a method for constructing behavioral signatures of software packages, according to one exemplary embodiment.

The steps of a method for constructing behavioral signatures of software packages, according to one exemplary embodiment, will now be described with reference to FIG. 1.

The method is described here in the case of a malicious software package, but it also applies to software packages that may be qualified benign.

A host server 20 (not shown in FIG. 1) is suitable for hosting a controlled environment SB for executing malicious software packages (or "malware"). The environment SB is arranged to host the execution of malicious software packages, and to track their activity at the system level, for example by identifying and registering API calls (API being the acronym of application programming interface) to the operating system or "OS" dedicated to this environment. Such an environment SB is for example a virtual environment, simulating an operating system, Windows for example. The environment SB is usually called a "sandbox". It is a particular execution environment that is controlled, i.e. constrained, and in which malicious software packages may be executed and observed without any risk to the operating system.

It is assumed that in an initial step E10 of collecting events, a set of malicious software packages to be analyzed is provided. These malicious software packages are known, i.e. their type, or family (such as virus, ransomware, etc.) has been identified. In the initial step E10 of collecting events, the malicious software packages of the set execute in the controlled environment SB of the server 20. The execution of each malicious software package generates a file comprising a sequential trace of API calls, or event trace, or even execution trace of the malicious software package, comprising a sequence of API calls to the operating system of the execution environment SB. For a malicious software package m of the set, a simplified event trace comprises, for example, the following events:
ProcessEvent:: RUN
ModuleEvent:: LOAD
ThreadEvent:: RUN
MemoryEvent:: ALLOC At the end of the step E10 of collecting events, a set of files, each forming one execution trace of one malicious software package of the set and comprising one sequential event trace is obtained. It will be noted that to one software package may correspond a plurality of execution traces, the latter possibly depending not only on the configuration of the sandbox SB, but also on external factors such as access to a command and control server.

In a following step E20 of populating a training database, the files comprising the execution traces generated by the various malicious software packages in the collecting step E10 are stored in a training database BDA. The training database BDA therefore contains a set of execution traces, each of the traces corresponding to the execution of one malicious software package, and taking the form of a sequential sequence of events.

The set of events generated during the execution of malicious software packages in the controlled environment SB and stored in the training database BDA is denoted E. Thus $E=\{e_1, e_2, \ldots, e_r\}$, r being the total number of events. The execution trace of malicious software package m, i.e. the trace produced during the execution of the latter in the controlled environment SB of the server S is denoted: $(e_1(m), e_2(m), \ldots, e_s(m))$, s being the number of events comprised in the execution trace of software package m.

In a following phase E30 of construction of behavioral labels, in an embedding step E31, the set E of the events of the execution traces associated with the execution of the malicious software packages, and obtained in the preceding step E20, is embedded in a vector space F of small dimension. That is, each event associated with an execution trace of a malicious software package, for example each event $e_i(m)$, $1 \le i \le s$ associated with the execution trace of malicious software package m, is associated a vector in the vector space F.

The embedment of the events of the execution traces of the malicious software packages in vector space F uses a lexical embedding technique implemented by means of an unsupervised machine-learning algorithm called "Word2Vec" and developed by Google; this algorithm is based on artificial neural networks trained to reconstruct the linguistic context of a word. The principle of Word2Vec is as follows: from a large corpus of texts, teach an artificial neural network seeking to explain a word depending on its context. The context of the word is usually defined as words near a target word in texts seen during training. At the end of this phase, the rows of the matrix encoding the neural network form vectors, each of which is by construction associated with one target word. The particularity of this technique is that the vectors resulting from this training encode the semantics of the contexts of the words encountered in the training corpus. Thus, words that share similar contexts are represented by similar numerical vectors and words which are similar in their representation are semantically close. This embedment makes it possible to analyze a word in its context.

The technique implemented in the Word2Vec algorithm is used to embed the events of the execution traces of the malicious software packages in the vector space F. By analogy, an event observed during the execution of a malicious software package corresponds to a word, and an execution trace of a malicious software package corresponds to a sentence. The text corpus corresponds to all the files that it was possible to generate in the controlled environment SB in the collecting step E10 and that were used to construct the training database BDA populated in the populating step E20.

The machine training associated with the embedment in the vector space is carried out on all the execution traces of the malicious software packages of the training database BDA. This training makes it possible to obtain a vector space F of dimension n, such that each event of an execution trace of a malicious software package of the training database is represented by a single vector $v_i$ having n coordinates in the space F.

The dimension n of the vector space F may be qualified small because it is very much smaller than the cardinal of the set E of events. In practice, it is comprised between 5 and 50. In the exemplary embodiments provided, the dimension of the vector space F is of the order of 5 to 7.

The particularity of this embedment is that it preserves information on the context of occurrence of the events. Thus, the vectors of space F are linked, just as the events E resulting from the execution of a malicious software package may be, thus encoding the activities of the software package. At the end of the embedding step E31, one embedment p: E→F, $p(e_i)=v_i$ is obtained for every $1 \leq i \leq r$. In particular, each execution trace of the training database BDA may be translated into a sequence of vectors of the vector space F via the embedment p:

$(e_1(m), e_2(m), \ldots, e_s(m)) \rightarrow (v(m), v_2(m), \ldots, v_s(m))$, for any malicious software package m.

For example, a representation of events of the execution trace of malicious software package m in vectors, in the case where n=5 is:

ProcessEvent:: RUN→[0.1, 0.3, 7.8, 0.3, 6.0]
ModuleEvent:: LOAD→[0.1, 0.4, 4.5, 7.8, 0.3]

In a following clustering step E32, the vectors obtained in the preceding embedding step E31 are clustered in order to group similar vectors together.

The implemented cluster analysis of data is an unsupervised machine-learning technique intended to make groups of similar entities. It aims to divide a dataset, here the vectors obtained in the previous step E31, into different packets that are uniform in the sense that the data of each packet, or sub-set, share common characteristics that most often correspond to proximity criteria that are defined by introducing measurements and classes of distance between the data. A plurality of algorithms that may be used to implement such a cluster analysis already exist. In a first exemplary embodiment, the k-means clustering algorithm is used. The principle of this algorithm is as follows: given points and an integer k, the problem is to divide the points into k groups, called clusters, so as to minimize all of the distances between each point and the centroid of the cluster of this point. The k-means clustering algorithm is applied to the vectors obtained beforehand. Tests with k=8, 9 or 10 have given optimal results.

In another exemplary embodiment, the "DBSCAN" algorithm (DBSCAN standing for density-based spatial clustering of applications with noise) is used. This algorithm is a density-based clustering algorithm: it creates clusters/groups of data in pointwise dense regions, even if it means not assigning a cluster to isolated points, which are then called "outliers".

The combination of the embedment of the events of the execution traces of the malicious software packages of step E31 and the cluster analysis of step E32 makes it possible to make groups of semantically similar events. A generalization of the events, which generalization is produced entirely by the data, and is useful for supervision of the behaviors of malicious software packages because the produced generalization encodes the semantics of the activity of the malicious software packages, is obtained. The embedding and clustering steps are unsupervised, and therefore do not require any skilled information or expert intervention.

It is assumed that the clustering step E32 has allowed L clusters, or data groups, corresponding to L sets of vectors each representing similar behaviors, to be obtained.

In a following step E33 of representing a malicious software package by behavioral labels, to each vector $v_i$ of the space F a single label $l_i$, $l_i \in \{1, 2, \ldots, L\}$, is assigned. Thus, let L be the total number of clusters obtained at the end of the clustering step E32. With each vector $v_i$ of the space F is associated a single label $l_i$, $l_i \in \{1, 2, \ldots, L\}$ depending on the cluster, or data group, to which it belongs. Thus, with each vector trace, corresponding to an execution trace of a malicious software package m, is associated a single label trace:

$(v_1(m), v_2(m), v_3(m), \ldots, v_s(m)) \rightarrow (l_1(m), l_2(m), l_3(m), \ldots, l_s(m))$, for any malicious software package m.

There are a number of advantages to using behavioral labels to represent the execution of the malicious software packages. The number L of labels is much smaller than the size of the set E of events: L<<|E|, where the sign || represents the cardinal of a set. Thus, the extraction of signatures and the search for signatures, which are described below, are much simpler in terms of computational complexity. Moreover, the use of labels makes it possible to avoid certain evasion techniques: the raw value of the event no longer counts, only the semantics of the activity matter.

For example, for malicious software package m, the representation of its simplified execution trace in behavioral labels is:

Process Event:: RUN→1
ModuleEvent:: LOAD→2
ProcessEvent:: RUN→1

In a following step E40 of extracting behavioral signatures, behavioral signatures of malicious software packages are extracted.

To this end, for a malicious software package represented by a behavioral-label trace, a first type of signature called the "signature of the first order", which signature is based on patterns that are said to be simple, is defined. Such a signature of the first order is a k-gram of the label trace, i.e. a sequence of size k of successive labels present in the trace.

More formally, given malware m and $R(m)=(l_1(m), l_2(m), \ldots, l_s(m))$ its representation in behavioral labels with, $l_i(m) \in \{1, 2, \ldots, L\}$, a signature of the first order is a k-gram of $R(m)$, i.e. a sequence p of size k of the form:

$$p = (l_i(m), l_{i+1}(m), \ldots, l_{i+k}(m))$$

This k-gram p is referred to as the pattern of the first order or the pattern of the order 1 below.

A second type of signature is also defined to be a logical combination of patterns. More formally, logical patterns of all orders are defined recursively. Thus, given a malicious software package m, let $R(m) = (l_1(m), l_2(m), \ldots, l_s(m))$ be its representation in behavioral labels, with $l_i(m) \in \{1, 2, \ldots, L\}$. Let p and p' be combinations of patterns of order α and β, respectively. The combinations of patterns of order α+β present in $R(m)$ are defined by:

p+p' if the patterns p and p' are both present in the representation $R(m)$ in behavioral labels of malicious software package m, p∥p' if one of the patterns p or p' is present in the representation $R(m)$.

It will be noted that, in the case of a signature of the first order of size k, the combination of patterns is the pattern itself, i.e. the k-gram. The order of a combination of patterns is the number of patterns of the first order logically combined to obtain a signature.

By way of example, consider three simple patterns:
p1=(1, 2, 3)
p2=(2, 3, 4)
p3=(3, 2, 1)

Given m a malicious software package, let $R(m) = (l_1(m), l_2(m), \ldots, l_s(m))$ be its representation in behavioral labels, with $l_i(m) \in \{1, 2, \ldots, s\}$. Malicious software package m then possesses the signature of order 3, $(p_1 \& p_2) \| p_3$ if:

there are j and j' such that $(1, 2, 3) = (l_j(m), l_{j+1}(m), l_{j+2}(m))$ and $(2, 3, 4) = (l_{j'}(m), l_{j'+1}(m), l_{j'+2}(m))$;

or there is j such that $(3, 2, 1) = (l_j(m), l_{j+1}(m), l_{j+2}(m))$.

Thus, in step E40 of extracting behavioral signatures, the signatures of the first order and the signatures of order of at least 2 are extracted from the representations in behavioral labels of the execution traces of the set of malicious software packages.

It will be noted that it is not necessary to compute signatures of the first order for all values of k. Specifically, when k is too large, the pattern risks being too specific to a small sample of malicious software packages (it is disadvantageous subsequently to look for patterns that are too specific); in all cases, the patterns that are looked for subsequently are those that reflect reproducible behavior in a plurality of samples of malicious software packages with similar behavior.

At the end of step E40 of extracting behavioral signatures of software packages, a set of signatures is available; this set is composed of signatures of the first order and signatures of higher order that are characteristic of the behavior of the malicious software packages comprised in the training database BDA.

In order to obtain good results, it has been found in practice that an initial corpus, corresponding to the number of malware execution traces, comprising 50 files per family, gave good results, i.e. the signatures extracted and characterizing the malicious software packages of a family.

It is assumed in this exemplary embodiment that the server 20 hosts the controlled environment SB, the training database BDA and the implementation of the steps of the method for constructing behavioral signatures of software packages. For example, the server 20 hosts a cloud-computing environment in which a first virtual machine is dedicated to the controlled environment SB, a second virtual machine is dedicated to the DBA training database and a third virtual machine is dedicated to the implementation of the steps of the method. In a second exemplary embodiment, the controlled environment SB is stored on a first server separate from the server 20 and the training database BDA is stored on a second server, separate from the server 20. In one particular case of this exemplary embodiment, the data intended to populate the training database BDA are supplied by a data supplier to a manager of the training database BDA, for example to a security solutions provider who supplies the populated training database BDA to another actor, a network manager for example. It will be noted that in this case the steps E10 of collecting and E20 of populating the training database are optional. Specifically, the training database BDA is then supplied already populated, by a security solutions provider.

The method for constructing behavioral signatures of software packages has been described here for the case of malicious software packages. It is equally well applicable to benign software packages. Specifically, there are also families of benign software packages that share common characteristics, especially as regards their behavior, which it is good to classify. The method may thus be applied to these benign software packages, especially with a view to qualifying new threats as described below. It will be noted that, as regards benign software packages, execution traces may be collected in an environment that is less constrained than a conventional sandbox. Specifically, it is not necessary to obtain these traces in a controlled environment, since the risk to the environment in terms of security is quite low.

The method for constructing behavioral signatures of software packages may advantageously be used to classify malicious software packages into a family of malicious software packages.

To this end, a training database BDA' of tagged malicious software packages is used. "Tagged" means that each malicious software package in the database is associated with the name of the family to which it belongs: "Emotet virus", "wannacry ransomware", "trojan horse", etc. Thus the database BDA' may be used by a supervised training algorithm dedicated to the classification of malicious software packages. Once the database BDA' of tagged malicious software packages has been populated, signatures are learned, or constructed, i.e. the operations of the method for constructing behavioral signatures of software packages such as described above are implemented on the database BDA' of tagged malicious software packages. At the end of this training, a signature database that comprises signatures extracted from the behavioral-label traces associated with the execution of the malicious software packages is created. The signature database may then be used as a set of variables during supervised learning. The learning algorithm automatically searches the database for the behavioral signatures which are the most characteristic of a given family of malicious software packages comprised in the training database. The learnt model, constructed from the behavioral signatures of software packages, allows malicious software packages to be classified automatically. Specifically, given a new software package the behavior of which is questionable, the steps of the method are implemented and the extracted signatures are compared with those which best characterize the malicious software packages of the database BDA' of tagged malicious software packages. This comparison makes it possible to identify the family to which the new software package belongs. It will be noted that this classification is made without a priori knowledge of the family to which the new software package belongs. The classification is automatic and is not deceived by any evasion techniques implemented by malware because the variables that are used, in the present case behavioral signatures, are by nature resistant to evasion because they are constructed by generalizing the notion of events, by virtue of the context thereof during execution.

The method for constructing behavioral signatures of software packages may also advantageously be used to detect and qualify new threats. To this end, the training database BDA populated by means of the most exhaustive possible known set of execution traces of malicious software packages in the populating step E20 is completed in order to obtain a completed training database that comprises, in addition to the execution traces of known malicious software packages, execution traces of benign software packages. The steps of the method for constructing behavioral signatures are then implemented on this completed training database. If a zero-day attack, i.e. a vulnerability that has not been published or that has no known patch, which uses a mode of action different from the known threats contained in the completed training database is undergone, then a behavior different from those stored in the database of extracted signatures will be observed; specifically, new signatures specific to this new attack will be extracted. The execution traces of benign software packages are taken into account in order to obtain the most exhaustive possible set of software-packages behaviors. It is moreover possible to analyze, as regards this new malicious software package, similarities with known malicious software packages by comparing the signatures extracted from the new malicious software package with those present in the signature database associated with the known malicious software packages.

Figure 2:
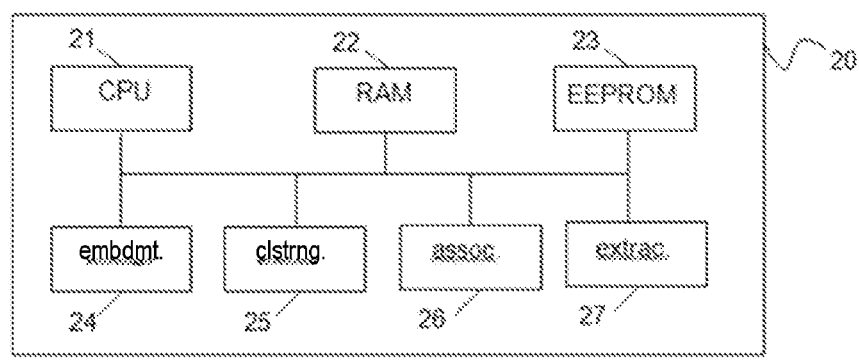
FIG. 2 is a schematic representation of a server able to implement some of the steps of the method for constructing behavioral signatures of software packages, according to one exemplary embodiment.

A server able to implement some of the steps of the method for constructing behavioral signatures of software packages, according to one exemplary embodiment, will now be described with reference to FIG. 2.

The server 20 is a piece of computer equipment that conventionally comprises:
- a processing unit 21, or CPU ("central processing unit"), arranged to execute code instructions,
- a set of memories, including a volatile memory 22 of RAM ("random access memory") type, used to execute code instructions, store variables, etc., and a storage memory 23 of flash memory or EEPROM ("electronically erasable programmable read-only memory") type. The storage memory 23 is designed to store data and applications. In particular, the storage memory 23 stores a software module for constructing behavioral signatures of software packages, which module is arranged to implement the steps of the method for constructing behavioral signatures of software packages that are implemented by the server 20.

The server 20 also comprises:
- an embedding module 24, arranged to embed execution traces of a set of software packages in a vector space, an execution trace of a software package comprising at least one event and being representative of the execution of the software package, said embedment being intended to represent an event of the execution trace with a vector encoding a context of occurrence of the event. The embedding module 24 is arranged to implement the embedding step E31 of the method for constructing behavioral signatures of software packages described above. The embedding module receives as input a set of execution traces of software packages that is comprised in a training database BDA (not shown in FIG. 2);
- a clustering module 25, arranged to cluster the vectors associated with the software packages of the set, said clustering generating at least one data group, the data group being representative of a behavior, a behavioral label being associated with said data group. The clustering module 25 is arranged to implement the clustering step E32 of the method for constructing behavioral signatures of software packages described above;
- an associating module 26, arranged to associate a behavioral label with a vector, the behavioral label associated with the vector being representative of the data group to which the vector belongs, and association of a behavioral-label trace with a vector trace, said label trace being representative of the execution of a software package. The associating module 26 is arranged to implement the labeling step E33 of the method for constructing behavioral signatures of software packages described above;
- an extracting module 27, arranged to extract from the label trace at least one behavioral signature associated with the software package. The extracting module 27 is arranged to implement the extracting step E34 of the method for constructing behavioral signatures of software packages described above.

The embedding module 24, clustering module 25, associating module 26 and extracting module 27 are preferably software modules arranged to implement the embedding step E31, clustering step E32, associating step E33 and extracting step E34 of the method for constructing behavioral signatures of software packages described above, respectively.

The invention therefore also relates to:
- a computer program comprising instructions for implementing the method for constructing behavioral signatures of software packages described above when this program is executed by a processor of the server 20, and
- a readable storage medium on which the above-described computer program is stored.

Although the present disclosure has been described with reference to one or more examples, workers skilled in the art will recognize that changes may be made in form and detail without departing from the scope of the disclosure and/or the appended claims.

The invention claimed is:

1. A method for constructing behavioral signatures of software packages performed by a device, said method comprising:
   embedding execution traces of a set of software packages in a vector space, an execution trace of a software package comprising at least one event and being representative of execution of the software package, said embedding representing an event of the execution trace with a vector encoding a context of occurrence of the event,
   performing a cluster analysis of vectors associated with the software packages of the set, said cluster analysis generating at least one data group, the data group being representative of a behavior, a behavioral label being associated with said data group,
   associating a behavioral label with a vector, the behavioral label associated with the vector being representative of the data group to which the vector belongs, and association of a behavioral-label trace with a vector trace, said label trace being representative of the execution of the software package, and extracting from the label trace at least two behavioral signature associated with the software package, a first of said at least two behavioral signatures being a signature of a first order corresponding to a k-gram present in the behavioral-label trace and a second of said at least two behavioral signatures being a signature of an order equal to at least two obtained by a combination of at least two signatures of the first order by using Boolean operators, the combination of the signatures of the first order being present in the execution trace of the software package.

2. The method for constructing behavioral signatures of software packages as claimed in claim 1, comprising collecting execution traces of the set of software packages, an event of an execution trace of a software package corresponding to an API call to the operating system of a server hosting a controlled environment for executing software packages.

3. The method for constructing behavioral signatures of software packages as claimed in claim 1, wherein the embedding is based on training of an artificial neural network that seeks to explain an event depending on context.

4. The method for constructing behavioral signatures of software packages as claimed in claim 1, comprising using the method by a module for classifying software packages, said module using a training database of tagged malicious software packages, a tag specifying a family to which a malicious software package belongs, signatures characteristic of families of malicious software packages being extracted, a new software package being automatically classified into a family of malicious software packages by comparing signatures extracted for said new software package with those characteristic of the families.

5. The method for constructing behavioral signatures of software packages as claimed in claim 1, comprising using the method by a module for detecting new malicious software packages, said module using a completed training database comprising, in addition to malicious software packages, benign software packages, the module being fed as input a new software package and detecting a new threat when the behavior of the new software package differs from the behavior of the software packages of the completed training database.

6. A server for constructing behavioral signatures of software packages, said server comprising:
    a processor; and
    a non-transitory computer-readable medium comprising instructions stored thereon which when executed by the processor configure the server to:
    embed execution traces of a set of software packages in a vector space, an execution trace of a software package comprising at least one event and being representative of the execution of the software package, said embedding representing an event of the execution trace with a vector encoding a context of occurrence of the event,
    cluster vectors associated with the software packages of the set, said clustering generating at least one data group, the data group being representative of a behavior, a behavioral label being associated with said data group,
    associate a behavioral label with a vector, the behavioral label associated with the vector being representative of the data group to which the vector belongs, and association of a behavioral-label trace with a vector trace, said label trace being representative of the execution of the software package, and
    extract from the label trace at least two behavioral signatures associated with the software package, a first of said at least two behavioral signatures being a signature of a first order corresponding to a k-gram present in the behavioral-label trace and a second of said at least two behavioral signatures being a signature of an order equal to at least two obtained by a combination of at least two signatures of the first order by using Boolean operators, the combination of the signatures of the first order being present in the execution trace of the software package.

7. A non-transitory computer-readable data medium on which is stored program code instructions which when executed by a processor of a server configure the server to construct behavioral signatures of software packages by:
    embedding execution traces of a set of software packages in a vector space, an execution trace of a software package comprising at least one event and being representative of execution of the software package, said embedding representing an event of the execution trace with a vector encoding a context of occurrence of the event,
    performing a cluster analysis of vectors associated with the software packages of the set, said cluster analysis generating at least one data group, the data group being representative of a behavior, a behavioral label being associated with said data group,
    associating a behavioral label with a vector, the behavioral label associated with the vector being representative of the data group to which the vector belongs, and association of a behavioral-label trace with a vector trace, said label trace being representative of the execution of the software package, and
    extracting from the label trace at least two behavioral signatures associated with the software package, a first of said at least two behavioral signatures being a signature of a first order corresponding to a k-gram present in the behavioral-label trace and a second of said at least two behavioral signatures being a signature of an order equal to at least two obtained by the combination of at least two signatures of the first order by using Boolean operators, the combination of the signatures of the first order being present in the execution trace of the software package.

* * * * *